(12) United States Patent
Ours et al.

(10) Patent No.: US 7,980,386 B2
(45) Date of Patent: Jul. 19, 2011

(54) LIFTING ARM SYSTEM FOR CONVEYOR

(75) Inventors: Dave Ours, Marshall, MI (US); Sharon Juntunen, Portage, MI (US); Stanley L. Davis, Maple Grove, MN (US); Stanley L. Davis, II, Minneapolis, MN (US)

(73) Assignee: Kellogg Company, Battle Creek, MI (US)

( * ) Notice: Subject to any disclaimer, the term of this patent is extended or adjusted under 35 U.S.C. 154(b) by 134 days.

(21) Appl. No.: 12/535,140

(22) Filed: Aug. 4, 2009

(65) Prior Publication Data
US 2010/0025192 A1 Feb. 4, 2010

Related U.S. Application Data

(60) Provisional application No. 61/085,923, filed on Aug. 4, 2008.

(51) Int. Cl.
B65G 21/10 (2006.01)
(52) U.S. Cl. .................. 198/861.5; 198/861.3
(58) Field of Classification Search ............... 198/860.1, 198/861.1, 861.3, 861.5
See application file for complete search history.

(56) References Cited

U.S. PATENT DOCUMENTS

| 45,336 A | 12/1864 | Nimbs |
| 2,561,997 A * | 7/1951 | Smith ........................ 198/861.5 |
| 2,660,432 A | 11/1953 | Wilske et al. |
| 3,702,600 A | 11/1972 | Bright et al. |
| 3,837,510 A | 9/1974 | McWilliams |
| 4,011,935 A | 3/1977 | Massey |
| 4,203,314 A * | 5/1980 | Vandlik et al. ............. 198/861.5 |
| 4,279,555 A | 7/1981 | Rydell |
| 4,367,814 A | 1/1983 | Young |
| 5,568,857 A | 10/1996 | Chen et al. |
| 5,701,781 A | 12/1997 | Giles |
| 5,913,655 A | 6/1999 | Maday |
| 6,220,427 B1 | 4/2001 | Ratz et al. |
| 6,488,145 B1 | 12/2002 | Diego et al. |
| 2002/0179420 A1 * | 12/2002 | Enomoto ................... 198/861.5 |

FOREIGN PATENT DOCUMENTS

| DE | 633180 C | 7/1936 |
| GB | 775937 A | 5/1957 |

OTHER PUBLICATIONS

International Search Report Dated Dec. 17, 2009; 4 Pgs.

* cited by examiner

Primary Examiner — James R Bidwell
(74) Attorney, Agent, or Firm — Dickinson Wright PLLC

(57) ABSTRACT

The lifting system includes a lifting portion and a hinging portion for lifting a conveyor The lifting portion is fixed to a structure and extends from the structure to mate with the conveyor at a lifting point. The lifting portion moves the conveyor vertically upward and downward at the lifting point with no horizontal movement at the lifting point. The hinging portion is pivotally connected to the conveyor at a conveyor pivot and extends from the conveyor to engage the structure. The hinging portion is further pivotally connected to the structure to allow for controlled movement in an arced path at the conveyor pivot of the conveyor. The controlled movement of the conveyor along the arced path at the conveyor pivot varies the angular position of the conveyor and maintains the position of the conveyor over the transportable container as the lifting portion moves the conveyor vertically at the lifting point.

11 Claims, 3 Drawing Sheets

LIFTING ARM SYSTEM FOR CONVEYOR

CROSS REFERENCE TO RELATED APPLICATION

This application claims the benefit of U.S. Provisional Patent Application Ser. No. 61/085,923 for LIFTING ARM SYSTEM FOR CONVEYOR, filed on Aug. 4, 2008, which is hereby incorporated by reference in its entirety.

BACKGROUND OF THE INVENTION

1. Field of the Invention

The present invention relates to a lifting system that supports a conveyor to a structure and further lifts the conveyor to vary the angular position of the conveyor and control the flow of product into a transportable container.

2. Description of the Prior Art

It is known in the prior art to have a lifting system that varies the vertical position of a conveyor end. The known systems are typically pivoted at a first end while a second end is allowed to rotate about the pivot to move the second end vertically.

An example of one such system is disclosed in U.S. Pat. No. 4,011,935 to Massey. The '935 patent discloses a combined sorter and conveyor for articles of considerable bulk or weight. The conveyor is broken down into a plurality of sections. Each section of the conveyor has a first end pivoted with a second end that is moveable between conveying and discharging positions. The movement of the second end is controlled by air cylinders and pistons.

Another example of one such system is disclosed in U.S. Pat. No. 4,279,555 to Rydell. The '555 patent discloses a conveyor system for stacking sheets of rigid material. The system includes an input conveyor that extends horizontally across the top of a base frame. The system further includes an elevator conveyor that extends forwardly from the base frame at a first pivot for vertically swinging between a raised and lowered position. The elevator conveyor has a receiving end and an exit end. A discharge conveyor is pivotally connected to the elevator conveyor at the exit end of the elevator conveyor. The discharge conveyor is provided in a horizontal level position to discharge the sheets of rigid material upon a stack. The sheets move along the elevator conveyor onto the discharge conveyor which deposits the sheets on top of the stack. As the sheets are discharged onto the stack from the machine, the elevator conveyor is automatically elevated about the first pivot to intermittently raise the discharge conveyor a distance equal to the thickness of the sheet. The first pivot is complex and includes a plurality of shafts journaled between two beams. The shafts carry sets of pulley wheels around which the conveyor belts are trained. The elevator conveyor uses multiple pulleys to maintain tension in the conveyor belt as the exit end of the elevator conveyor moves between the raised and lowered positions as the receiving end of the elevator conveyor remain stationary.

SUMMARY OF THE INVENTION

In view of the above, the present invention is directed to a lifting system having a lifting portion and a hinging portion to support a conveyor to a structure and move the conveyor to vary the angular position of the conveyor and control the flow of product into a transportable container. The lifting system includes a conveyor having a receiving end and an exit end for transporting product between a feed conveyor and the transportable container. A lifting portion secures the conveyor to the structure and engages the conveyor at at least one lifting point. The lifting portion moves the conveyor vertically at the at least one lifting point while maintaining the horizontal position of the conveyor at the lifting point. The lifting system further includes a base support that further secures the conveyor to the structure. A hinging portion having at least one hinged arm pivotally engages the conveyor at a conveyor pivot. The at least one hinged arm extends from the conveyor pivot to pivotally engage the base support. The hinging portion pivotally engages both the conveyor pivot and the base support to allow for movement of the conveyor along an arced path at the conveyor pivot. The movement along the arced path varies the angular position of the conveyor and maintains the position of the exit end of the conveyor over the transportable container to control the flow of product into the transportable container as the lifting portion moves the conveyor vertically at the lifting point. This is advantageous in that there is a more uniform discharge from the exit end of the conveyor.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE EXEMPLARY EMBODIMENT

Figure 1:
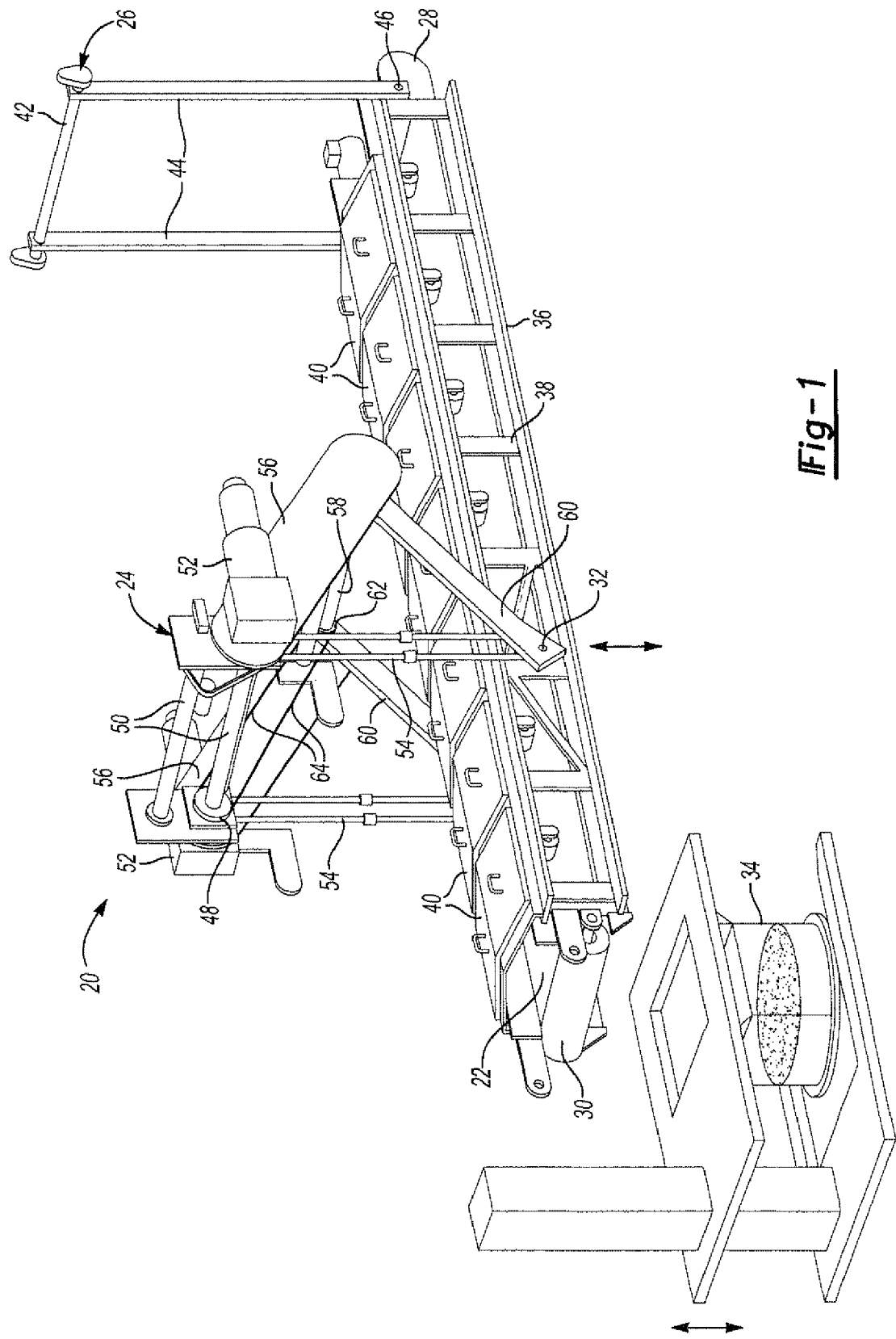
FIG. 1 is a perspective view of a lifting system according to the present invention.
Figure 2:
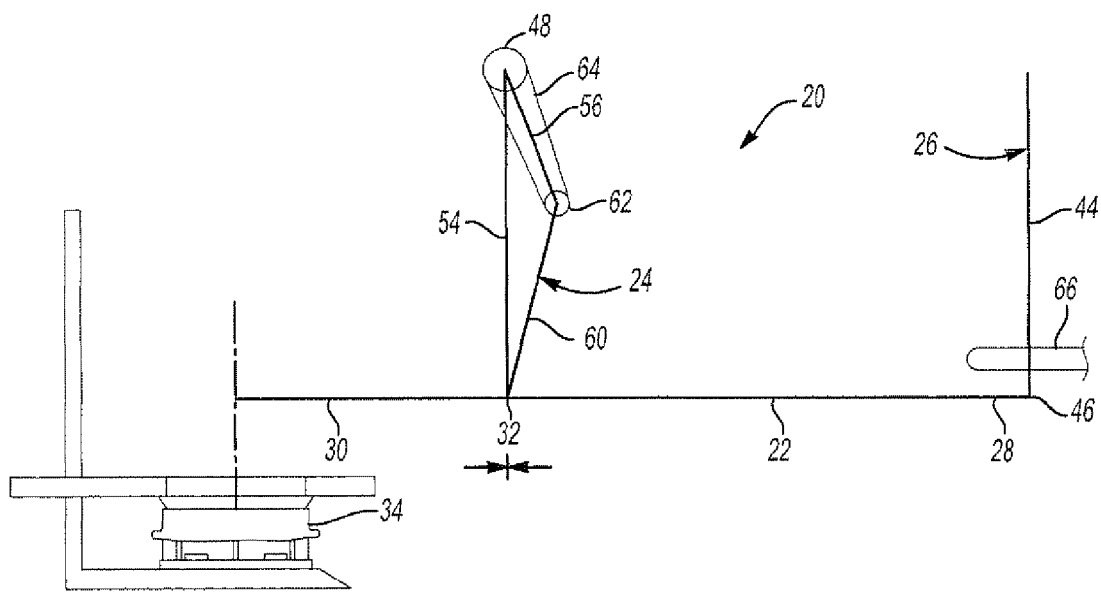
FIG. 2 is schematic view of the present invention with the exit end of the conveyor in an initial position over the center of a container prior to disposing product into the container.
Figure 3:
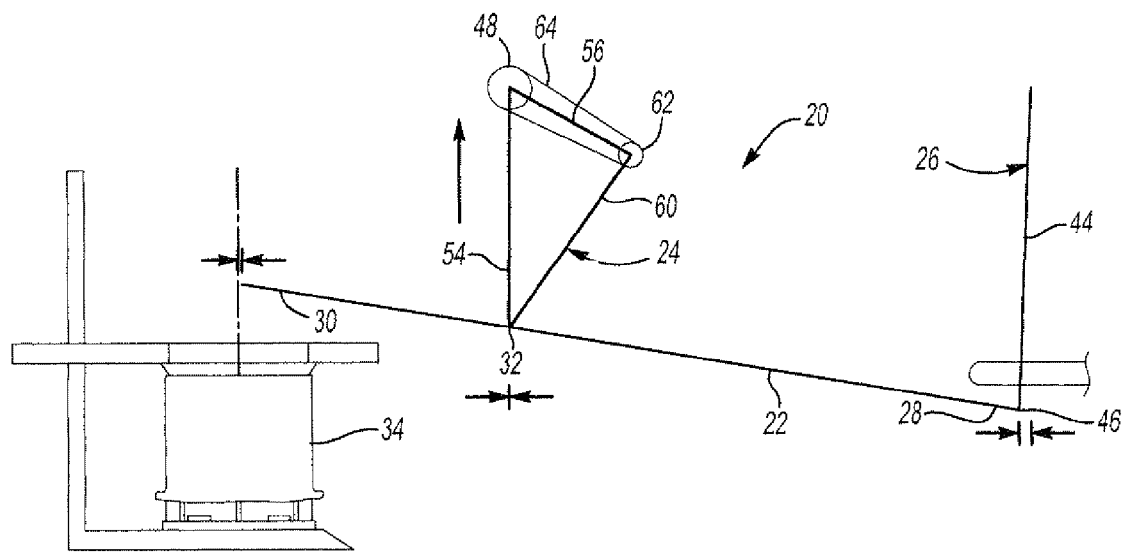
FIG. 3 is schematic view of the present invention with the exit end of the conveyor in an adjusted position after the lifting system has began to lift the conveyor.
Figure 4:
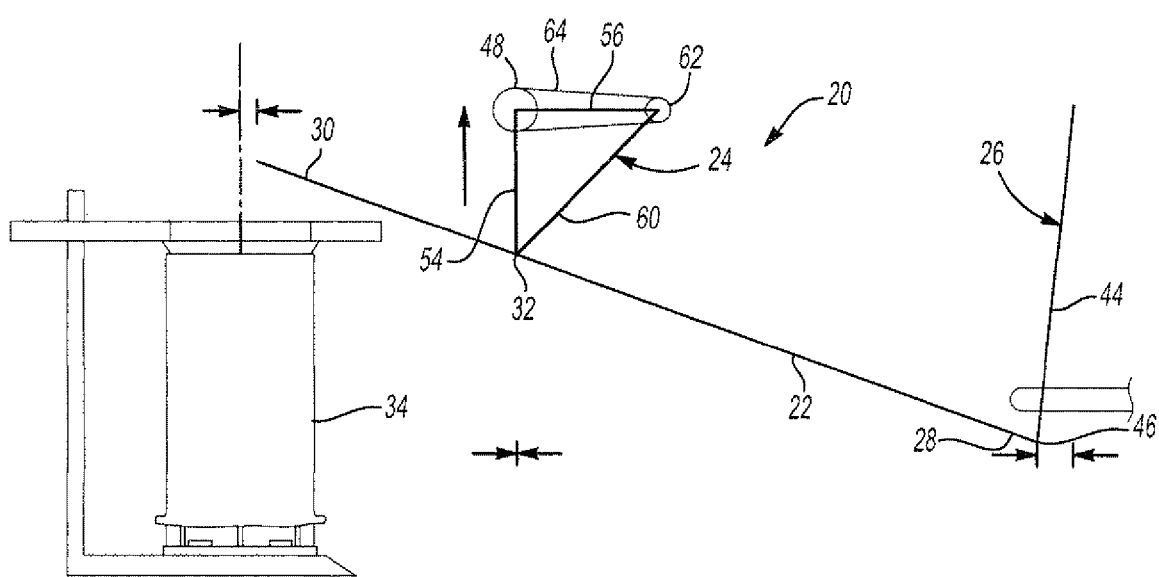
FIG. 4 is schematic view of the present invention with the exit end of the conveyor in a further adjusted position after the lifting system has continued to lift the conveyor.

Referring to the Figures, wherein like numerals indicate like or corresponding parts throughout the several views, a lifting system 20 for supporting a conveyor 22 to a structure and moving the conveyor 22 to vary the angular position of the conveyor 22 and control the flow of product into a transportable container 34 is generally shown.

The lifting system 20 includes a lifting portion 24 generally indicated and a hinging portion 26 generally indicated for lifting a conveyor 22 having a receiving end 28 and an exit end 30. The lifting portion 24 is fixed to a structure and extends from the structure to mate with the conveyor 22 at a lifting point 32 for moving the conveyor 22 vertically upward and downward at the lifting point 32 with no horizontal movement at the lifting point 32. The hinging portion 26 engages the conveyor 22 at a conveyor pivot 46. The hinging portion 26 is pivotally connected to the conveyor 22 and extends from the conveyor 22 to engage the structure. The hinging portion 26 is further pivotally connected to the structure to allow for controlled movement in an arced path at the conveyor pivot 46. The controlled movement of the conveyor 22 along the arced path at the conveyor pivot 46 varies the angular position of the conveyor 22 and maintains the position of the conveyor 22 over a transportable container 34 as the lifting portion 24 moves the conveyor 22 vertically at the lifting point 32.

The conveyor 22 extends between the receiving end 28 and the exit end 30 for transporting product between the ends 28, 30. The receiving end 28 is where product or bulk goods are introduced to the conveyor 22 and the exit end 30 is where product leaves the conveyor 22. In the exemplary embodiment, a feed conveyor 66 or hopper may be disposed over the receiving end 28 for introducing product onto the conveyor 22, but any means of disposing product onto a conveyor 22 known in the art may be used.

The phrase "product" includes, but is not limited to, the following: agricultural products like seeds, rice, grains, vegetables, fruits, chemical products like fine chemicals, pharmaceuticals, raw chemicals, fertilizers, plastics like plastic resin pellets, plastic pails, rejected plastic parts, machined plastic parts, cereals and cereal products such as wheat, a variety of machined parts of all sorts, wood products like wood chips, landscaping material, peat moss, dirt, sand, gravel, rocks and cement. All of these types of materials and similar bulk packaged materials are intended to be encompassed in the present specification and claims by this phrase.

The product is fed from the exit end 30 of the conveyor 22 to a transportable container 34, including, but not limited to storage vessels, packages, and any other transportable container 34 known in the art The subject invention minimizes the distance product must fall from the exit end 30 of the conveyor 22 into the container 34, thus minimizing breakage of the product. As product is fed into the container 34, the container 34 moves upwardly to accommodate more product, and as the container 34 moves upwardly, the exit end 30 of the conveyor 22 moves upwardly therewith to maintain its vertical spacing with the container 34. In addition to minimizing the distance product must fall, the horizontal variance at the exit end 30 of the conveyor 22 is minimized such that the position of the exit end 30 remains near the center of the container 34 during filling. This positioning over the center of the container 34 allows for a more even distribution of product into the container 34. This is especially true when the product is a flowable product.

The conveyor 22 is typically an endless belt conveyor 22 but may be any conveyor 22 known in the art. When using a belt conveyor 22, a head idler roller and a tail idler roller may be rotatably mounted respectively at the receiving and exit ends 28, 30 of the conveyor 22. The conveyor 22 may include a conveyor motor that drives at least one of the head idler roller and tail idler roller. The idler rollers may be powered by any method known in the art.

The conveyor 22 may include a support structure 36 or conveyor 22 housing having opposing support walls 38 for supporting the conveyor 22. The conveyor 22 is secured within the support structure 36 between the opposing support walls 38. The conveyor 22 may further include a conveyor cover 40 for covering the conveyor 22. The cover may be any conveyor 22 known in the art. The conveyor cover 40 extends between the opposing support walls 38 for at least a portion of the length of the conveyor 22 between the receiving and exit ends 28, 30. The conveyor cover 40 protects the product transported on the conveyor 22 from contamination.

The hinging portion 26 engages the conveyor 22 and allows for limited movement of conveyor 22 while providing further support. In the exemplary embodiment, the hinging portion 26 is disposed adjacent the receiving end 28 of the conveyor 22, but may be disposed anywhere along the conveyor 22.

The hinging portion 26 includes a base support 42 that is secured to a structure, including, but not limited to a ceiling, floor, wall or any other structure known in the art. At least one hinged arm 44 extends downwardly from the base support 42 and engages the conveyor 22. The at least one hinged arm 44 is pivotally connected to the base support 42 to allow the hinged arm 44 to rotate about the base support 42. In the exemplary embodiment, the base support 42 is a metal rod having a circular cross section to allow the hinged arm 44 to rotate about it, but any base support 42 having a pivot may be used. The base support 42 may be any material, shape or size known in the art. While the exemplary embodiment shows a single base support 42, multiple base supports 42 may be used. For example, a system using a plurality of hinged arms 44 may have a base support 42 for each of the hinged arms 44.

The at least one hinged arm 44 pivotally connects to the conveyor 22 at a conveyor pivot 46 disposed on one of the opposing side walls of the conveyor 22. When the conveyor 22 includes a support structure 36, the conveyor pivot 46 is disposed along one of the opposing support walls 38. While the conveyor pivot 46 may be at any point along the conveyor 22, in the exemplary embodiment, the conveyor pivot 46 is adjacent the receiving end 28. In the exemplary embodiment, the hinged arm 44 is a metal rod having a fixed length, but the hinged arm 44 may be any material, shape or size known in the art. The hinged arm 44, pivotally connected at both the base support 42 and conveyor pivot 46, is pivotable at both the base support 42 and conveyor pivot 46 to allow for limited movement at the conveyor pivot 46 of the conveyor 22 in an arced path. As the lifting portion 24 moves the conveyor vertically upward and downward at the lifting point 32, the hinging portion 26 will control the movement of the receiving end 28 of the conveyor 22 along the arced path. As a result, the movement of the receiving end 28 is minimized in both the vertical and horizontal directions such that the position of the receiving end 28 is maintained below the feed conveyor or hopper for receiving product. In addition, the movement of the conveyor 22 along the arced path at the conveyor pivot 46 varies the angular position of the conveyor 22 as the lifting portion 24 moves the conveyor 22 vertically at the lifting point 32. This movement maintains the position of the exit end 30 of the conveyor 22 over the transportable container 34 to control the flow of product into the transportable container 34.

The lifting portion 24 secures the conveyor 22 to the structure and engages the conveyor 22 at at least one lifting point 32 to move the conveyor 22 vertically at the at least one The at least one first sprocket 48 is in communication with the at least one lifting point 32 via a first chain 54 to move the conveyor 22 vertically upward and downward at the lifting point 32. While a first chain 54 may be used to move the conveyor 22 vertically upward and downward at the lifting point 32, any means of moving a conveyor 22 vertically may be used. In the exemplary embodiment, a pair of first chains 54 are used to connect each of the lifting points 32 with its corresponding first sprocket 48. The first chain 54 lifts and lowers the conveyor 22 at the lifting point 32. In the exemplary embodiment, a gear mechanism is used to raise and lower the conveyor 22, via the first chain 54, at the lifting point 32, but any means of raising and lowering a conveyor 22 may be used.

The lifting portion 24 includes at least one first arm 56 that extends from the first support bar 50 to a second support bar 58. The lifting portion 24 includes at least one second arm 60 that is pivotally connected to the second support bar 58 and extends from the second support bar 58 to the lifting point 32. The second support bar 58 includes at least one second sprocket 62 being disposed thereon. Each of the at least one second sprockets 62 are connected to the at least one first sprocket 48 disposed on the first support bar 50 via a second chain 64. The second chain 64 is a fixed length. While the lifting system 20 may only have a single first arm 56 and a single second arm 60 pivoted at a single second support bar 58, the exemplary embodiment includes a pair of first and second arms 56, 60 being spaced from each other and connected to each other via the first and second support bars 50, 58.

The at least one first chain 54, second chain 64, first arm 56 and second arm 60 form a triangle and work together to move the conveyor 22 vertically at each of the lifting points 32. When the first chain 54 raises or lowers the conveyor 22 to move the conveyor 22 vertically upward and downward, the first and second arms 56, 60 move to maintain horizontal position of lifting point 32 while maintaining the horizontal position of the conveyor 22 at the lifting point 32. The lifting portion 24 is secured to a structure, including, but not limited to a ceiling, floor, wall or any other structure known in the art. The lifting portion 24 extends from the structure to engage the conveyor 22 at least one lifting point 32. The lifting point 32 is disposed on one of the opposing sides of the conveyor 22. When the conveyor 22 includes a support structure 36, the lifting point 32 is disposed along one of the opposing support walls 38. The lifting point 32 and mated lifting portion 24 may be disposed at any position along the length of the conveyor 22. In the exemplary embodiment, the lifting portion 24 mates with the conveyor 22 at a pair of lifting points 32, each of the lifting points 32 being disposed on opposite sides of the support walls 38.

The lifting portion 24 includes at least one first sprocket 48 disposed on a first support bar 50. The lifting portion 24 may include a plurality of first sprockets 48 being disposed on a single first support bar 50 or a plurality of first sprockets 48 being disposed on a plurality of first support bars 50. The first support bar 50 is rotatably connected with a motor 52 for rotating the first support bar 50 and the at least one first sprocket 48 disposed thereon. It should be appreciated that a plurality of motors 52 may be used to rotate the each of the first support bars 50 and/or the first sprocket 48 disposed thereon. In the exemplary embodiment, as shown in FIG. 1, the first sprockets 48 are disposed on separate first support bars 50, with each of the first support bars 50 being individually connected to a motor 52. The use of multiple motors 52 provides safety in that the load required to lift the conveyor 22 is divided among the multiple motors 52. While the exemplary embodiment shows the use of multiple motors 52 and first support bars 50, it should be noted that typically one motor 52 and one first support bar 50 with multiple first sprockets 48 disposed thereon is used. the lifting points 32. While the lifting system 20 allows the lifting points 32 to move vertically, it does not allow for any horizontal movement at the lifting points 32.

As the first chain 54 raises or lowers the conveyor 22, the first and second arms 56, 60 move so that no horizontal movement occurs at the lifting points 32. This is done based on the gear ratio between the first and second sprockets 48, 62 along with the second chain 64. As the motor 52 rotates the first support bar 50 and first sprocket 48 disposed thereon, the second chain 64 connecting the first and second sprockets 48, 62 causes movement in the first and second arms 56, 60. This movement maintains the horizontal position of the conveyor at the lifting point. In the exemplary embodiment the first sprockets 48 have 34 teeth while the second sprockets 62 have 17 teeth provide to a 2:1 ratio. This ratio is just exemplary and may be adjusted to any other ratio based on the movement desired. For example, a lifting portion 24 having first sprockets 48 with 34 teeth and second sprockets 62 with 34 teeth to provide a 1:1 ratio would also work.

While there is no horizontal movement at the lifting points 32, there is slight horizontal movement at the receiving end 28 and exit end 30 based on the position of the lifting points 32 and the amount of vertical movement at the lifting points 32. In the exemplary embodiment, the lifting points 32 are disposed ⅓ of the length from the exit end 30. In this placement, the exit end 30 moves horizontally about ±1 inch while the receiving end 28 moves horizontally about ±3 inches. If the lifting points 32 were placed at the center of conveyor 22 the horizontal movement would be about equal between the receiving end 28 and exit end 30. So based on where one seeks to minimize the horizontal movement would determine the placement of the lifting points 32. For example, the lifting points 32 could be placed at the exit end 30 of the conveyor 22 so that there would be no horizontal movement at the exit end 30.

As the lifting portion 24 raises or lower the vertical position of the lifting point 32, the hinging portion 26 controls the movement of the receiving and exit ends 28, 30 of the conveyor 22. Since the hinged portion is a fixed length and pivotable at both the base support 42 and the conveyor pivot 46, the controlled movement along the arced path will cause the movement at the exit end 30 to move vertically upward or downward.

Minimal horizontal movement at the exit end 30 is advantageous in that there is a more uniform feeding from the conveyor 22. Past conveyors 22 that have moved vertically have had horizontal movement at the exit end 30. This horizontal movement at the exit end 30 results in product being non-uniformly distributed. For example, if one desires to position the exit end 30 over the center of product container 34, any horizontal movement would result in the exit end 30 moving away from the center and thus filling the product container 34 more towards one of the sides than the other. The present invention minimizes this horizontal movement to provide a more uniform product fill.

The process of lifting the conveyor 22 will now be described. It should be noted that while only the lifting process is being described, the lowering process would involve a similar process to lifting the conveyor 22, but in reverse.

The conveyor 22 starts in a level position. As needed, based on manual or automatic input, the conveyor 22 may be lifted. The object of the present invention is to maintain the exit end 30 a desired height or vertical space over the center of the container 34 in which the product is fed from the conveyor 22 into the container 34 so as to minimize breakage of the product.

To begin, product is introduced onto the receiving end 28 of a conveyor 22, and transported along the conveyor 22 from the receiving end 28 to the exit end 30. Next, the conveyor 22 is moved vertically at the lifting point 32 while maintaining the horizontal position of the conveyor 22 at the lifting point 32 with the lifting portion 24 as product is disposed into the transportable container 34. To do this, the motor 52 will activate to rotate the at least one first support bar 50 and the at least one first sprocket 48 disposed thereon. The first sprocket 48 will rotate to begin lifting the conveyor 22 at the at least one lifting point 32 via the first chain 54. As the first chain 54 raises the conveyor 22, second sprockets 62 disposed on the second support bar 58 are rotated, via the second chain 64, to move the second support bar 58 vertically upward from the conveyor 22 and horizontally away from the first sprocket 48 to maintain the horizontal position of the lifting point 32. This movement changes the angle between the first arm 56 and the second aim 60 to maintain the vertical only movement at the lifting point 32.

As the lifting portion 24 raises or lower the vertical position of the lifting point 32, the hinging portion 26 controls the movement of the receiving and exit ends 28, 30 of the conveyor 22. Since the hinged portion is a fixed length and pivotable at both the base support 42 and the conveyor pivot 46, the controlled movement along the arced path will cause the movement at the exit end 30 to move vertically upward or downward. The conveyor 22 moves along an arced path at the conveyor pivot 46 to vary the angular position of the conveyor 22 as the lifting portion 24 moves the conveyor 22 vertically at the lifting point 32. This movement maintains the vertical spacing of the exit end 30 of the conveyor 22 over the transportable container 34 to control the flow of product into the transportable container 34

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A lifting system for supporting a conveyor to a structure and moving the conveyor to vary the angular position of the conveyor and control the flow of product into a transportable container comprising:
   a conveyor having a receiving end and an exit end for transporting product between a feed conveyor and the transportable container;
   a lifting portion for securing said conveyor to the structure and engaging said conveyor at at least one lifting point for moving said conveyor vertically at said at least one lifting point while maintaining the horizontal position of said conveyor at said lifting point;
   a base support for further securing said conveyor to the structure;
   a hinging portion having at least one hinged arm pivotally engaging said conveyor at a conveyor pivot and extending from said conveyor pivot to pivotally engage said base support;
   wherein said hinging portion pivotally engages both said conveyor pivot and said base support for allowing movement of said conveyor along an arced path at said conveyor pivot to vary the angular position of said conveyor and maintain the position of said exit end of said conveyor over the transportable container to control the flow of product into the transportable container as said lifting portion moves said conveyor vertically at said lifting point;
   said lifting portion having at least one first support bar with at least one first sprocket disposed thereon, said at least one first support bar being rotatable for rotating said at least one first sprocket and including a first chain that engages both of said at least one first sprocket and said at least one lifting point for moving said conveyor vertically at said lifting point as said first sprocket rotates; and
   said lifting portion having at least one first arm having a fixed length and extending from said at least one first support bar to a second support bar said second support bar having at least one second sprocket disposed thereon and in communication with said at least one first sprocket and including at least one second arm having a fixed length and pivotally engaging said second support bar and extending from said second support bar to pivotally engage said at least one lifting point.

2. The lifting system as set forth in claim 1 including a second chain having a fixed length and engaging said first sprocket and said second sprocket for varying the position of said first and second arms as said first sprocket rotates to maintain the horizontal position of said conveyor at said lifting point as said lifting portion moves said conveyor at said lifting point.

3. The lifting system as set forth in claim 1 including at least one motor for rotating said at least one first support bar.

4. The lifting system as set forth in claim 1 wherein said conveyor pivot is located adjacent said receiving end for allowing movement of said receiving end of said conveyor along an arced path.

5. The lifting system as set forth in claim I further including a support structure having opposing support walls, said conveyor being secured within said support structure between said opposing support walls.

6. The lifting system as set forth in claim 5 further including a conveyor cover extending between said opposing support walls and covering at least a portion of said conveyor between said receiving end and said exit end for protecting the product on said conveyor from contamination.

7. A method for securing a conveyor having a receiving end and an exit end to a structure and moving the conveyor to vary the angular position of the conveyor and control the flow of product into a transportable container having an opening for receiving the flow of product using a lifting system having a lifting portion that engages the conveyor at a lifting point and a hinging portion that engages the conveyor at a conveyor pivot comprising the steps of:
   vertically spacing the exit end of the conveyor over the opening of the transportable container;
   disposing product from the exit end of the conveyor into the opening of the transportable container;
   moving the conveyor vertically at the lifting point while maintaining the horizontal position of the conveyor at the lifting point with the lifting portion as product is disposed into the opening of the transportable container; and
   moving the conveyor along an arced path at the conveyor pivot with the hinging portion to vary the angular position of the conveyor and maintain the vertical spacing of the exit end of the conveyor over the opening of the transportable container to control the flow of product into the transportable container as the lifting portion moves the conveyor vertically at the lifting point.

8. The method as set forth in claim 7 further comprising the steps of:
   introducing product onto the receiving end of a conveyor; and
   transporting product along the conveyor from the receiving end to the exit end.

9. The method as set forth in claim 7 wherein the moving the conveyor vertically step is includes the following steps:
   disposing at least one first sprocket on at least one support bar;
   extending a first chain between the at least one first sprocket and the at least one lifting point for moving the conveyor vertically at the lifting point as the first sprocket rotates; and
   rotating the at least one first sprocket for moving the conveyor vertically at the lifting point.

10. The method as set forth in claim 9 further including the steps of:
    extending at least one first arm having a fixed length from the at least one first support bar to a second support bar;
    pivotally engaging at least one second arm having a fixed length to both the second support bar and the at least one lifting point;
    disposing at least one second sprocket on the second support bar;

establishing communication between the at least one second sprocket and at least one first sprocket for varying the position of the first and second arms as the first sprocket rotates to maintain the horizontal position of the conveyor at the lifting point as the lifting portion moves the conveyor at the lifting point.

11. The method as set forth in claim 10 wherein the establishing communication step is further defined as extending a second chain having a fixed length between the at least one first sprocket and the at least one second sprocket for varying the position of the first and second arms as the first sprocket rotates to maintain the horizontal position of the conveyor at the lifting point as the lifting portion moves the conveyor at the lifting point.

* * * * *